United States Patent [19]

Ukita

[11] Patent Number: 5,477,510
[45] Date of Patent: Dec. 19, 1995

[54] OPTICAL DISC PLAYBACK AND DISPLAY APPARATUS

[75] Inventor: Yoshitaka Ukita, Kanagawa, Japan

[73] Assignee: Sony Corporation, Tokyo, Japan

[21] Appl. No.: 115,551

[22] Filed: Sep. 3, 1993

[30] Foreign Application Priority Data

Sep. 7, 1992 [JP] Japan ................... 4-264320

[51] Int. Cl.⁶ .................................. G11B 11/18
[52] U.S. Cl. .................. 369/18; 434/309; 434/317
[58] Field of Search .................. 369/18, 33, 32, 369/47; 345/123, 124, 125; 434/307, 308, 309, 317, 318, 335, 362, 169, 309

[56] References Cited

U.S. PATENT DOCUMENTS

| | | | |
|---|---|---|---|
| 4,639,225 | 1/1987 | Washizuka | 434/308 |
| 4,681,548 | 7/1987 | Lemelson | 434/308 |
| 5,033,969 | 7/1991 | Kamimura | 434/309 |
| 5,065,345 | 11/1991 | Knowles et al. | 434/308 |
| 5,365,502 | 11/1994 | Misono | 369/32 |

FOREIGN PATENT DOCUMENTS

| | | | |
|---|---|---|---|
| 3904344 | 8/1990 | Germany | 434/308 |
| 4013070 | 10/1991 | Germany | 434/310 |
| 56-74765 | 6/1981 | Japan . | |
| 62-279585 | 12/1987 | Japan | 369/18 |

Primary Examiner—Georgia Y. Epps
Assistant Examiner—Tan Dinh
Attorney, Agent, or Firm—Hill, Steadman & Simpson

[57] ABSTRACT

An optical disc playback and display apparatus comprising a playback block for reproducing the optical disc recorded with large quantities of character information or image information, a display block, rectangular in shape, for displaying reproduced character information or image information, and a touch panel input block superimposed on the rectangular display block. The novel constitution eliminates use of a conventionally practiced hardware keyboard, making the apparatus far thinner and therefore more portable as well as enhancing ease of search data input.

9 Claims, 4 Drawing Sheets

OPTICAL DISC PLAYBACK AND DISPLAY APPARATUS

BACKGROUND OF THE INVENTION

1. Field of the Invention

The present invention relates to an optical disc playback and display apparatus suitably applied to a so-called electronic book player.

2. Description of the Prior Art

Recently, a so-called electronic book implemented by a small-sized optical disc such as a CD-ROM (Compact Disc Read Only Memory) for example in which a large quantity of character information or image information such as of a dictionary has been commercialized and considered to be a useful information reference tool along an easy-to-use, portable electronic book player for reproducing the information stored in the optical disc.

A conventional electronic book player has a rectangular housing, a keyboard disposed on the housing, a disc drive accommodated under the keyboard, and a rectangular liquid crystal display disposed on an underside of a lid hingedly engaged with the housing, for example.

When search data is entered by operating keys on the keyboard, character information or image information searched (or reproduced) based on the entered data is displayed on the liquid crystal display. The information in the display is scrolled up or down on a line or page basis by operating a scroll key or page key on the keyboard. Such a constitution is proposed by Copending U.S. application Ser. No. 692,319 filed Apr. 26, 1991 for example.

However, since the conventional electronic book player has the keyboard and the display in a stacked relation as mentioned above, it is difficult to make the player thinner in size. Moreover, the relatively compact-sized keyboard results in narrowly spaced character keys disposed on it, making it awkward for a user to enter search key data.

OBJECTS AND SUMMARY OF THE INVENTION

It is therefore an object of the present invention to provide an optical disc playback and display apparatus which is far thinner in size than the prior-art apparatus for enhanced portability and ensures a smooth, deft key operation for entering search key data for enhanced ease-of-use.

In carrying out the invention and according to one aspect thereof, with reference to reference characters used for a preferred embodiment of the invention to be described, there is provided an optical disc playback and display apparatus comprising a playback block for reproducing an optical disc D recorded with character information or image information, a display block 12, rectangular in shape, for displaying reproduced character information or image information, and a touch panel input block 13 superimposed on the rectangular display block 12.

This setup allows search key data to be entered through the touch panel input block 13, eliminating use of a conventional keyboard having many operating keys.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
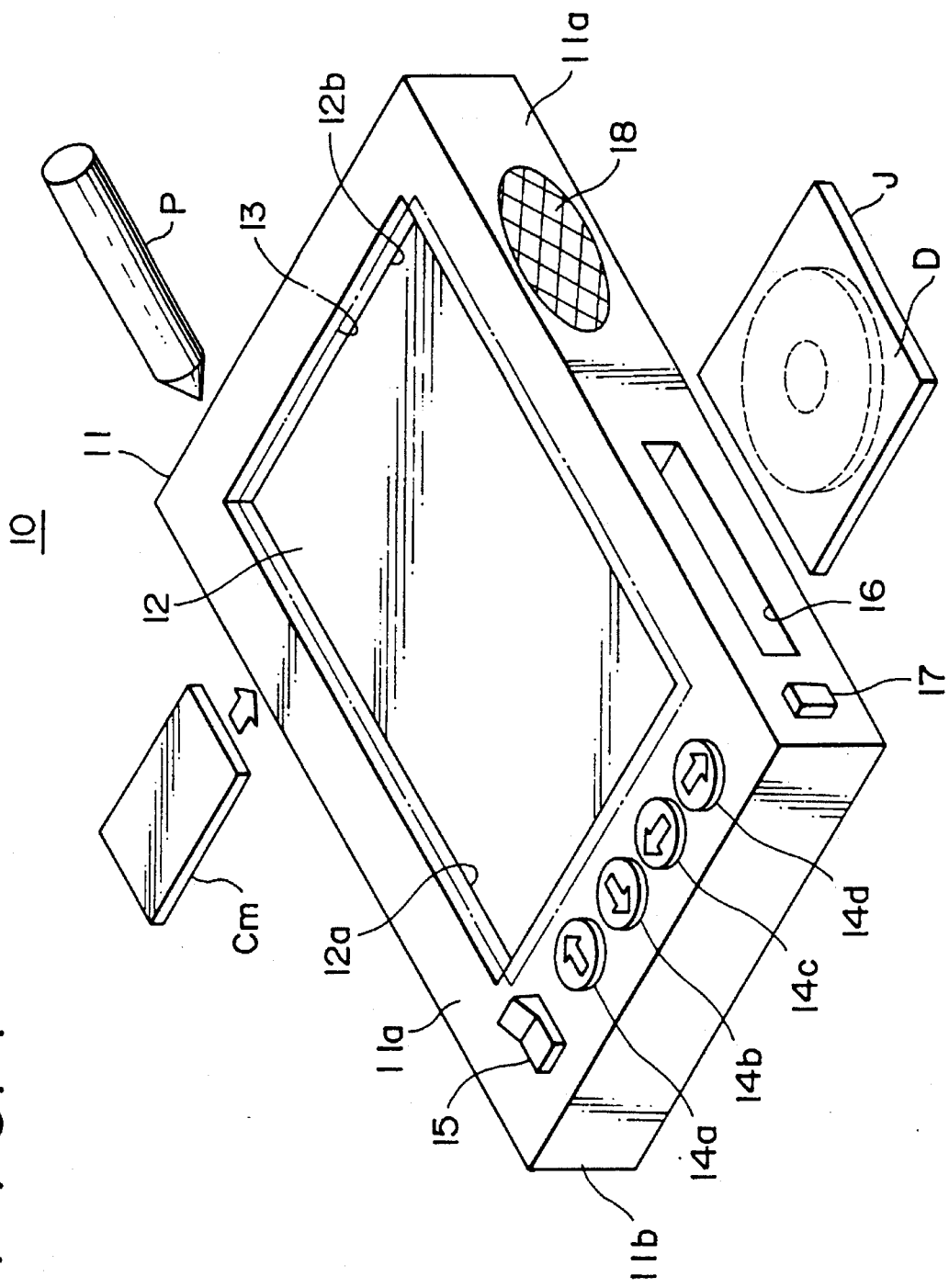
FIG. 1 is a perspective view of a mechanical construction of an optical disc playback and display apparatus practiced as a preferred embodiment of the invention.
Figure 2:
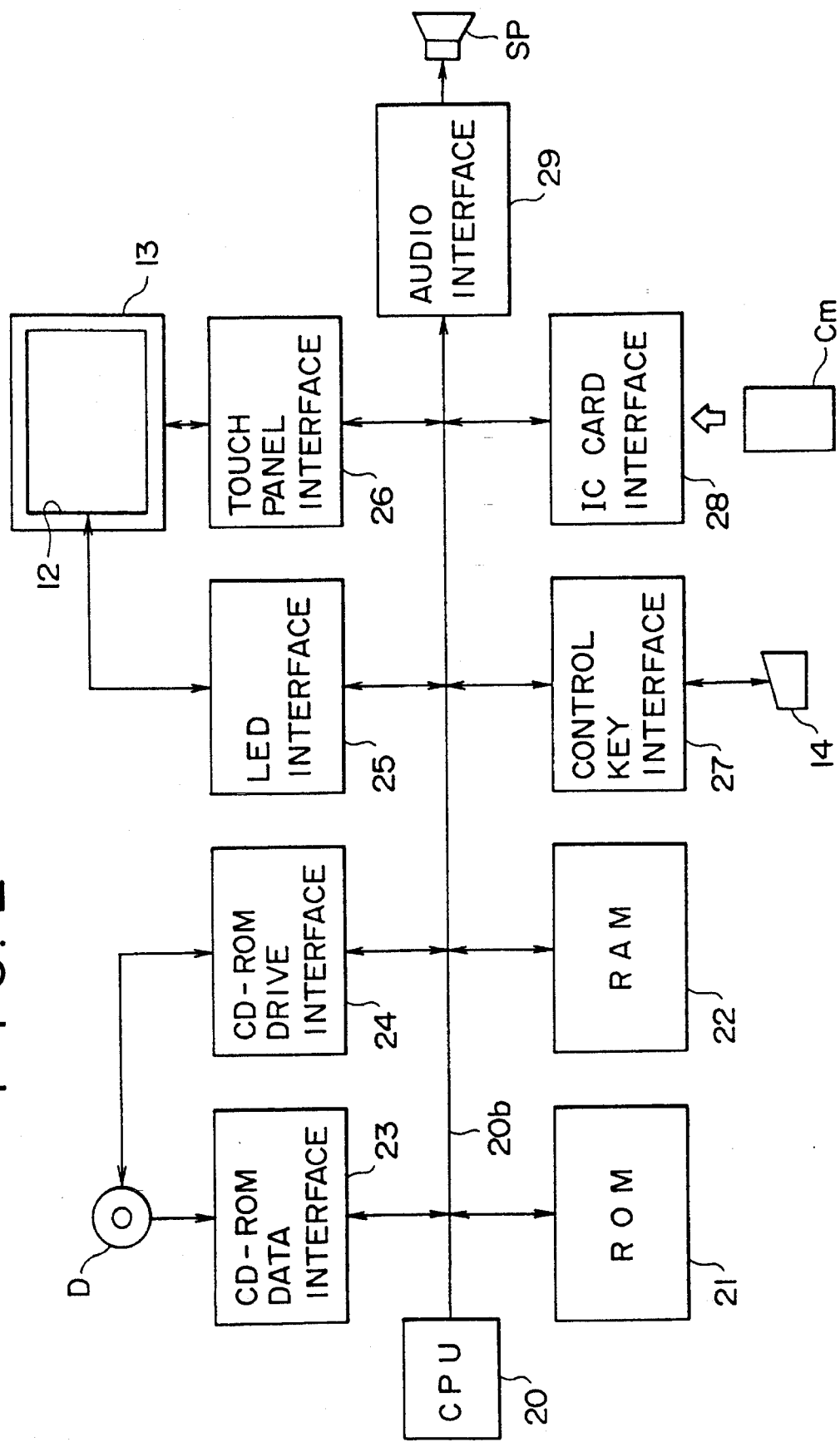
FIG. 2 is a diagram illustrating an electrical circuit lock of the preferred embodiment of FIG. 1.

Referring now to the drawings, wherein like reference characters designate like or corresponding parts throughout the several views, FIG. 1 shows a mechanical construction of an optical disc playback and display apparatus practiced as a preferred embodiment of the invention and FIG. 2 shows its electrical circuit block.

Referring to FIG. 1, reference numeral 10 indicates the optical disc playback and display apparatus (or so-called electronic book player) in its entirety. The optical disc playback and display apparatus 10 has a rectangular housing 11 disposed with a rectangular liquid crystal display element 12 that top thereof occupying most portion thereof.

In this embodiment, the display element 12 is superimposed with a transparent touch panel 13 as indicated by broken lines. Upon searching data, a keyboard is displayed on the display element 12 by means of software, allowing search key data to be entered from the touch panel 13 by means of a pen P for example. Thus, the elimination of a hardware keyboard makes the novel apparatus far thinner in size than the prior-art apparatus.

Four display control keys 14a, 14b, 14c and 14d and a power on/off switch 15 are disposed in alignment along a short side of the display element 12. Of the four display control keys, two keys on the power switch side, that is, keys 14a and 14b, are engraved respectively with arrow symbols directed oppositely to each other along a long side 12a of the display element 12. The other two keys 14c and 14d are engraved respectively with arrow symbols directed oppositely to each other along a short side 12b of the display element 12.

The housing 11 is disposed with a slot 16, an eject button 17, and an opening 18 for a speaker at a side wall 11a thereof. An optical disc (CD-ROM) D accommodated in a jacket J is loaded into a disk drive, not shown, through the slot 16.

On a side wall opposite to the side wall 11a, a slot, not shown, for loading an IC card Cm is disposed. If the IC card Cm is a RAM card, the apparatus is adapted so that searched data is stored in the RAM card for example. If it is a ROM card, the apparatus is adapted so that a program for data search is loaded from the ROM card.

This embodiment has a central processing unit (CPU) 20 connected to a program ROM 21 and a work area RAM 22 over a bus 20b.

This embodiment also has a CD-ROM data interface 23, CD-ROM drive interface 24, liquid crystal display interface 25, touch panel interface 26, display control key interface 27, IC card interface 28, and audio interface 29 to control the above-mentioned peripheral devices. The CPU 20 communicates with the peripheral devices via the bus 20b and the above-mentioned interface 23 through 29.

Figure 3:
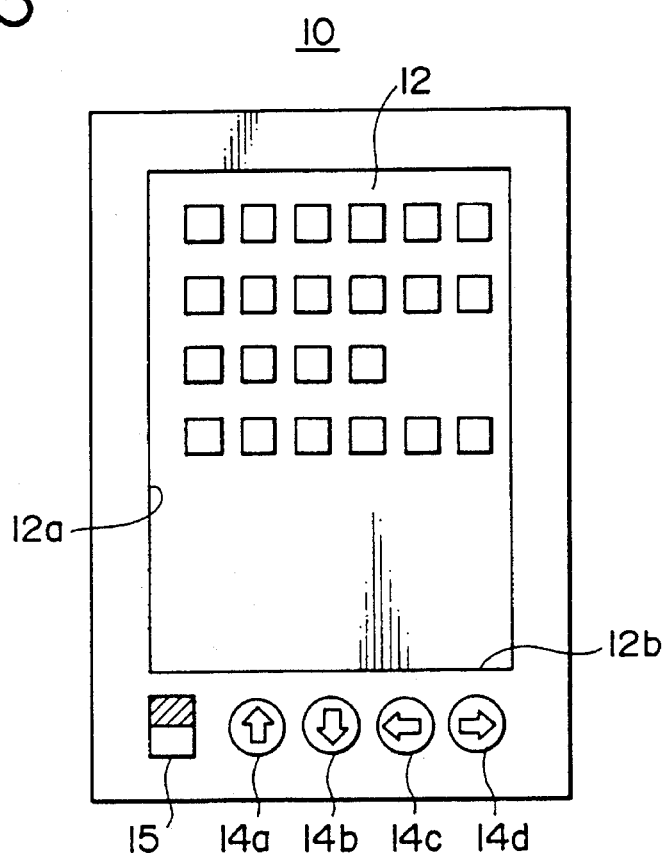
FIG. 3 is a top view for explaining an operation of the preferred embodiment of FIG. 1.
Figure 4:
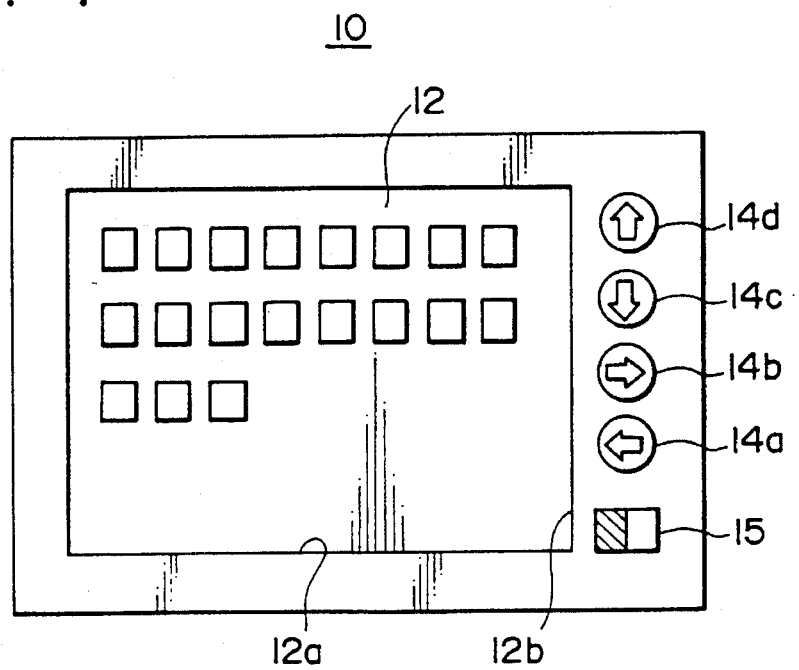
FIG. 4 is another top view for explaining the operation of the preferred embodiment of FIG. 1.

Now, referring to FIGS. 3 through 5, the embodiment of the invention will be described in operation. As shown in FIGS. 3 and 4 respectively, the liquid crystal display element 12 is adapted to selectively display information in a vertically long mode and a laterally long mode. The two display modes are provided for a reason that follows.

The vertically long display mode displays more lines than the laterally long display mode does, displaying a larger list of searched information. However, the number of characters displayed in one line in the vertically long display mode is smaller than that displayed in the laterally long display mode. This presents a problem especially when displaying English or the like with words wrapped around. A resultant conspicuous unevenness in line ends reduces attractiveness of the apparatus as a market product. Additionally, when a keyboard is displayed on the liquid crystal display element as with this embodiment, a space between character keys in the keyboard becomes narrower than in the laterally long display mode, making difficult a distinctive key operation. With the vertically long display mode, it is also a problem that there are more pieces of image information available on the market which are adapted to be displayed laterally long rather than vertically long.

While, more characters are displayed in one line in the laterally long display mode, making the unevenness in word wrapped around line ends less conspicuous than in the vertically long display mode, making the apparatus more attractive as a market product. When the keyboard is displayed as with this embodiment, the space between the keys becomes wider than that in the vertically long display mode, allowing an easier and more distinctive key operation. Availability of more pieces of image information suitably displayed laterally long is also an advantage to the laterally long display mode.

Thus, the embodiment is adapted to display the information in either the vertically long display mode or the laterally long display mode according to an application without impairing the portability of the apparatus and its attractiveness as a market product.

In this embodiment, in the vertically long display mode, the controls keys 14a through 14d are assigned with a following first combination of display control capabilities:

up scroll to the key 14a;

down scroll to the key 14b;

backward page to the key 14c; and forward page to the key 14d.

In the laterally long display mode, the keys 14a through 14d are assigned with a following second combination of display control capabilities:

backward page to the key 14a;

forward page to the key 14b;

downward scroll to the key 14c; and up scroll to the key 14c.

It will be apparent from FIGS. 3 and 4 that switching between the assignments of the combinations of the display control capabilities allows the directions of the arrows on the keys 14a through 14d to suitably correspond to the display scroll directions in both display modes, saving a user from being confounded by an orientation of the display in operating the display control keys.

Figure 5:
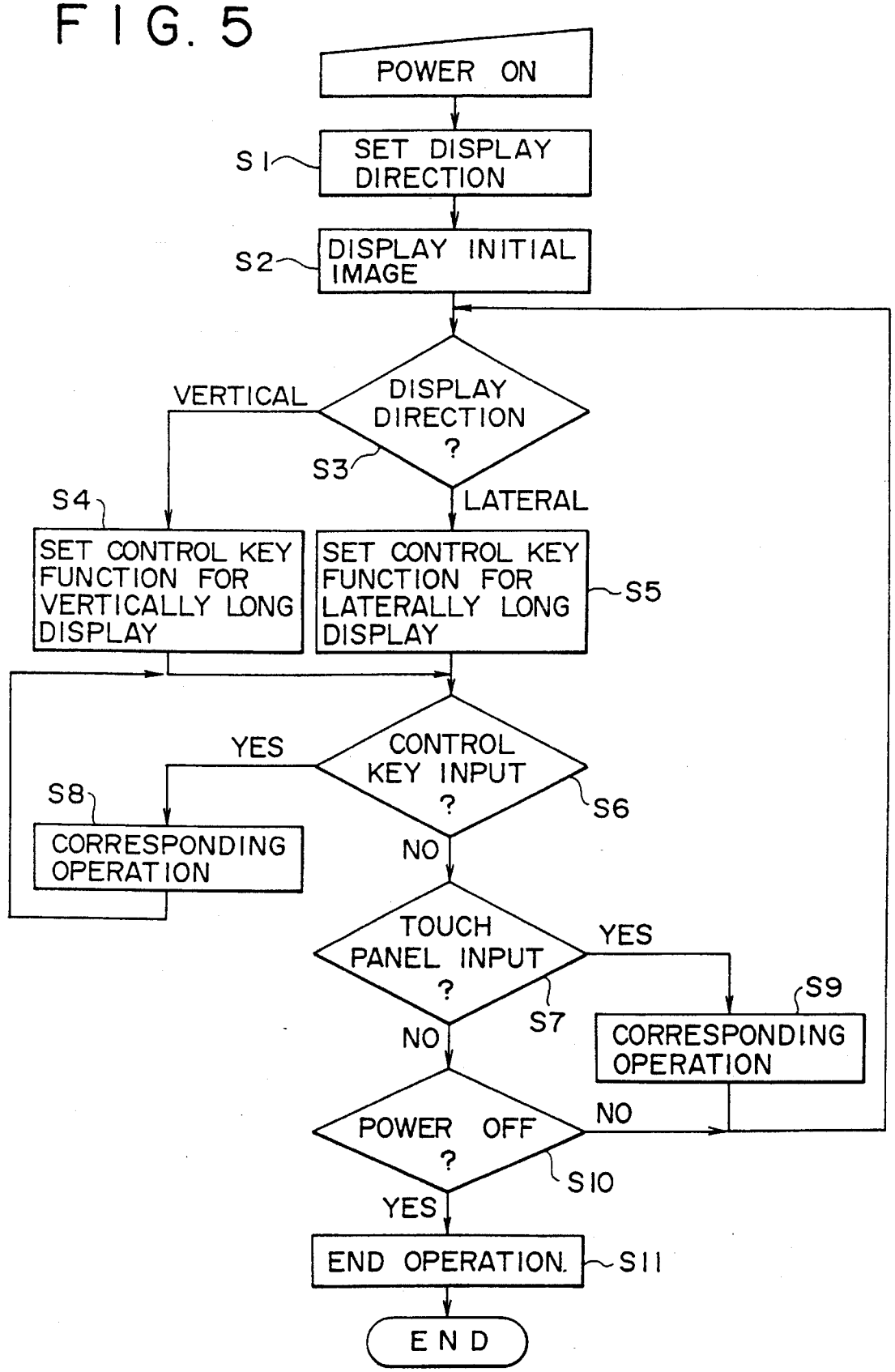
FIG. 5 is a flowchart for explaining the operation of the preferred embodiment of FIG. 1.

The switching between the assignments of the display control capabilities to the display control keys 14a through 14d is effected by means of software as shown in FIG. 5.

When the apparatus is powered on, either the vertically long display mode or the laterally long display mode is set according to display control information provided by an installed optical disc (or a software program recorded on the disc) (step S1) and initial image is displayed in the set mode (step S2).

In step S3, the CPU 20 determines which display mode has been set. If the vertically long display mode is set, the first combination of the display control capabilities is assigned to the keys 14a through 14d (step S4). If the laterally long display mode is set, the second combination of the display control capabilities is assigned to the keys 14a through 14d (step S5).

In steps S6 and S7, the CPU determines whether a display control key or a touch panel key has been operated. If any key has been operated, the CPU accordingly performs various operations including a scroll operation or a data search operation until the software terminates (steps S8 and S9).

When the power is turned off in step S10, the CPU performs system termination processing (step S11), upon which the apparatus ends operating.

It should be noted that, while the above-mentioned embodiment automatically sets one of the display modes by means of software, a variation can be made to the embodiment so that the mode is set manually by means of a special key. It should also be noted that, while the above-mentioned embodiment has been described by using a case in which English language or the like is displayed, languages that read from right to left, such as Persian, can be displayed as well by means of the same software or hardware as that used on the embodiment.

As described and according to the invention, there is provided the optical disc playback and display apparatus comprising the playback block for reproducing the optical disc recorded with large quantities of character information or image information, the display block, rectangular in shape, for displaying reproduced character information or image information, and the touch panel input block superimposed on the rectangular display block. The novel constitution thus eliminates use of the conventionally practiced hardware keyboard, making the apparatus far thinner and therefore more portable as well as enhancing ease of search data input.

Further, according to the invention, the display can be selectively used in either the vertically long display mode or the laterally long display mode to advantage as mentioned above. Additionally, switching between the assignments of the display control capabilities to the display control keys according to the selected display mode saves a user from being confounded by the orientation of the display.

While the preferred embodiment of the invention has been described using specific terms, such description is for illustrative purpose only, and it is to be understood that changes and variations may be made without departing from the spirit or scope of the appended claims.

What is claimed is:

1. A portable information search and display apparatus using a storing means for storing information data, said apparatus comprising:

a rectangular-shaped housing having an opening which is formed on the lateral side thereof for receiving said storing means;

a display device provided on a top surface of said housing and having a rectangular display area;

first key input means provided on the surface of said display device;

second key input means provided on the top surface of said housing and outside of said display device, and for controlling the operation of the portable information search and display apparatus, said second key input means having line scroll function keys and page scroll function keys; and reproducing means for searching the information data from said storing means according to operation of said first and second input key means and for displaying the information data on said display device.

2. A portable information search and display apparatus as claimed in claim 1, wherein said display device can either operate in a vertically long display mode or a laterally long display mode and the function of said physical cursor key means is exchanged based on said display mode.

3. A portable information search and display apparatus as claimed in claim 1, wherein said data storing means includes disc drive means for playback data stored in an optical disc.

4. A portable information search and display apparatus as claimed in claim 1, wherein said key input means comprises key data tablet means provided on top of said display device.

5. A portable information search and display apparatus as claimed in claim 4, wherein said data tablet means is a transparent touch tablet which is operable in cooperation with said display device.

6. A portable information search and display apparatus as claimed in claim 3, wherein said display device means is a transparent touch tablet which is operable in cooperation with said display device.

7. A portable information search and display apparatus as claimed in claim 6, wherein said rectangular display device is a liquid crystal display.

8. A portable information search and display apparatus as claimed in claim 1, furthering comprising:

receiving means provided on said housing for receiving an integrated circuit card having at least semiconductor memory.

9. A portable information search and display apparatus as claimed in claim 2, wherein said physical cursor key means includes a first pair of keys for performing said line scroll function in a vertically long display mode and a second pair of keys for performing said page scroll function in a vertically long display mode, said first pair of keys performing said page scroll function in said laterally long display mode, and said second pair of keys performing said line scroll function in said laterally long display mode.

* * * * *